(No Model.)

C. PETERSON.
KETTLE BAIL AND COVER.

No. 572,821. Patented Dec. 8, 1896.

WITNESSES:
Geo. H. Snyder
J. A. Paul

INVENTOR
Chas. Peterson,
BY A. H. Swarthout
ATTORNEY.

UNITED STATES PATENT OFFICE.

CHARLES PETERSON, OF OMER, MICHIGAN, ASSIGNOR OF ONE-HALF TO ANGUS McDONELL, OF SAME PLACE.

KETTLE BAIL AND COVER.

SPECIFICATION forming part of Letters Patent No. 572,821, dated December 8, 1896.

Application filed March 30, 1896. Serial No. 585,430. (No model.)

*To all whom it may concern:*

Be it known that I, CHARLES PETERSON, a citizen of the United States, residing at Omer, in the county of Arenac and State of Michigan, have invented certain new and useful Improvements in Kettle Bails and Covers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention is a kettle cover and bail, the cover dependent upon the bail for successful operation, as will hereinafter appear.

The invention consists in the peculiar construction, arrangement, and combination shown and described.

Figure 1:
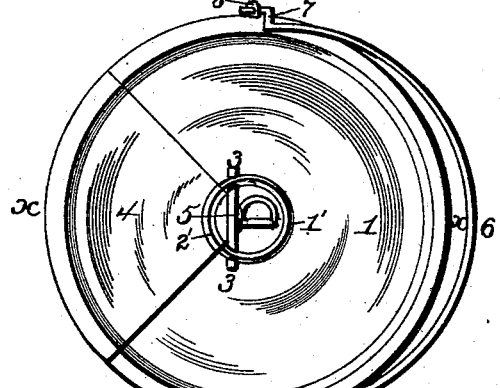
Figure 2:
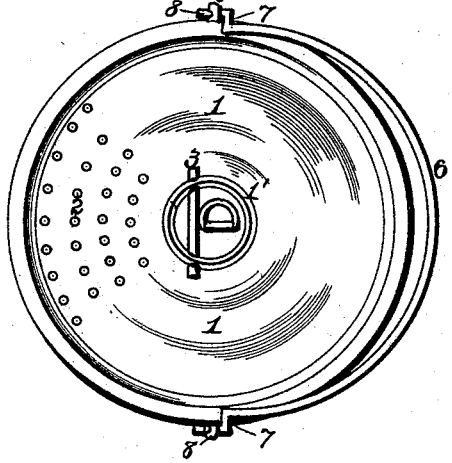
Figure 3:
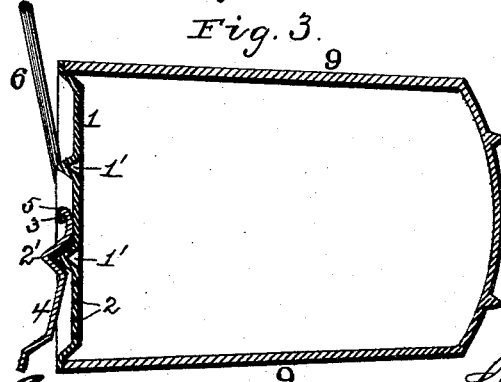

Figure 1 is a top view of a kettle provided with the cover and bail. Fig. 2 is the same view with a portion of the cover removed. Fig. 3 is a sectional view through the middle of the kettle and cover on line X X of Fig. 1.

In the drawings, 1 is the cover and is of the usual form of removable covers for kettles, having a turn-down portion adapted to fit within the rim of the kettle 9.

2 are a number of holes covering about one-fourth of the surface of the cover and arranged radially, through which holes the water from the kettle may pass when the kettle is turned upon its side, as shown in Fig. 3.

4 is a supplemental portion hinged to the cover 1 by the hinge 3, which consists of a rod secured in the cover 1 by passing it through the pressed-up portion of the ring 1' near the center of the cover, and is engaged by the curved portion 5 of the supplemental portion 4.

The circular ring 1' serves the double purpose of forming a part of the hinge and to catch in a corresponding ring 2' in the supplemental portion 4. As shown, the inner end of the portion 4 is turned up, so as to form a hook 5, which catches under the rod 3 at the same time that the raised ring 2' catches over the top of the one 1', and the ring 1' and the rod act together to prevent any possibility of the portion 4 becoming detached while in use. In order to detach the portion 4, its outer end must be raised up until the ring 2' becomes detached from the one 1' and the hook 5 can be drawn from under the rod 3. The rings 1' 2' act to supplement the rod 3 and prevent any outward movement of the part 4 until its outer end is raised high enough to detach the hook.

Any other method of hinging the supplemental portion 4 to the cover may be employed, the object being to cover up the holes 2 and prevent the passage of steam through them to a certain extent while the kettle is boiling and to deflect the steam arising from the water as it is poured through the holes, when the kettle is in the position shown in Fig. 3, to one side, thereby making it impossible to scald the hand of the operator with the hot steam as the kettle is drained, as is common.

It is common in draining a kettle of this character to hold the cover to the kettle by the hand or some implement in the hand pressed upon the cover. The slipping of the hand or of the implement, which may be occasioned by the hot steam scalding the hand, allows the cover to drop off and spill the contents of the kettle. In order to overcome this objection and to adapt the cover to a safe use, I have constructed a bail 6 in such form as to hold the cover to the kettle when the kettle is turned down, as shown in Fig. 3.

The ordinary bail extends in a bow directly from the kettle-lug 8 around to the opposite kettle-lug. The kettle-bail which I have designed for the purpose mentioned contains the right-angled offset 7 just at the top of the kettle, the offset extending inwardly over a portion of the kettle and cover and in such a position that when the kettle is turned down it, the offset, will clamp against the cover 1 and hold it securely to the kettle, as described.

I do not wish to confine myself to the particular form of construction shown of the supplemental portion 4 or the hinge 3, and any change may be made suggested by mechanical skill without departing from the principle of my invention.

Having thus described my invention, what I claim as new, and desire to secure by Letters Patent, is—

The cover, having the raised ring 1' around its center, and the rod 3 passed through the ring to form a part of the hinge, combined with the supplemental part 4, having its inner end formed into a hook to catch under the rod, and provided with a raised ring 2' to catch over the ring 1', and thus prevent the part 4 from becoming accidentally detached, substantially as shown.

In testimony whereof I hereunto affix my signature in the presence of two witnesses.

CHARLES PETERSON.

Witnesses:
C. D. BROOKS,
GEO. HAYES.